Patented Oct. 23, 1928.

1,688,511

UNITED STATES PATENT OFFICE.

FREDERICK WILLIAM VALLÉ-JONES, OF NEW OXLEY, WOLVERHAMPTON, ENGLAND, ASSIGNOR TO FOX, STOCKELL & COMPANY, OF LONDON, ENGLAND.

PRODUCTION OF ROAD-SURFACING MATERIAL.

No Drawing. Application filed April 10, 1928, Serial No. 269,014, and in Great Britain January 10, 1927.

This invention relates to the production of road-surfacing material of the kind in which a bituminous material is employed as a binder for broken stone, slag, granite or like material functioning as an aggregate.

Hitherto in the production of road-surfacing material of this character the aggregate has been mixed with tar, bitumen and similar material and maintained in a suitable liquid condition with the aid of heat.

Recently, colloidal mixtures or cold emulsions of bitumen, tar or the like have been developed for use in treating road surfaces and attempts have been made to employ such emulsions in coating aggregates which are subsequently to be placed in position and rammed, rolled or otherwise consolidated.

Difficulty has, however, been experienced in securing proper adhesion between the mixture and the aggregate.

The object of the present invention is to facilitate the production of road-surfacing material of the character of so-called "tarmacadams" by the use of colloidal mixtures or cold emulsions of bitumen, tar or the like with water and other emulsifying agents.

According to the invention the aggregate is first heated and cleansed by means of steam and is then while in a heated state brought together with the colloidal mixture or emulsion.

The treatment of the aggregate with steam may be effected by the employment of jets of saturated or superheated steam, the operation being carried out, for example, by introducing the aggregate into a vessel in which it may be agitated.

For this purpose mixers comprising conveying devices of known character may be used, the steam being admitted thereto for a sufficient time to ensure that the aggregate is raised to a suitable temperature and cleansed.

Water which may condense upon the aggregate will rapidly evaporate therefrom in consequence of the aggregate being hot and a hot dry aggregate will thus be obtained which may be mixed with the desired colloidal mixture.

The treatment of the aggregate with a colloidal mixture or cold emulsion may be carried out by injecting a stream of the same into a device adapted to maintain the aggregate in motion or, alternatively, the aggregate may be introduced into a perforated vessel which is then immersed in the colloidal mixture or emulsion after which the perforated vessel containing the aggregate may be withdrawn and the excess of emulsion allowed to drain away.

The treated aggregate thus obtained may be distributed over a suitable foundation and rammed, rolled or otherwise consolidated in any of the ways commonly employed in forming tar-macadam road beds.

The invention extends to the road-surfacing material produced in accordance with the invention and to road beds the surface layer of which is constituted by or furnished with a consolidated body of such material.

Having now described my invention, what I claim as new and desire to secure by Letters Patent is:—

1. The process of producing road-surfacing material which comprises first heating and cleaning a coarse aggregate of the character of stone by means of steam and then bringing the aggregate while in a heated state together with a colloidal mixture of bituminous material.

2. The process of producing road-surfacing material which comprises subjecting an aggregate of the character of stone to the action of steam and then introducing the stone in a dry and heated state into a colloidal mixture containing bituminous material.

3. The process of producing road-surfacing material which comprises subjecting stone-like material in a suitable state of division to agitation and to the action of steam and thereafter introducing the aggregate into a cold emulsion of bituminous material.

4. The process of producing road-surfacing material which comprises subjecting broken stone to the action of steam whereby the stone is raised in temperature and cleaned, withdrawing the stone from contact with the steam, thereby allowing condensed water to evaporate from the stone, and bringing the stone while still in a heated condition and in a dry state into intimate contact with an emulsion of bituminous material.

5. The process of producing road-surfacing material which comprises subjecting broken stone to the action of steam whereby the stone is raised in temperature. withdrawing the stone from contact with the steam, thereby allowing condensed water to evaporate from the stone, introducing the stone into a perforated vessel, immersing the perforated vessel containing the stone in a body of a cold colloidal emulsion of bituminous material and withdrawing the perforated vessel from the body of emulsion and allowing the excess of the latter to drain away from the stone.

In testimony whereof I have signed my name to this specification.

FREDERICK WILLIAM VALLÉ-JONES.